INVENTOR
GEORGE WEHMANN

June 25, 1963    G. WEHMANN    3,094,869
REMOTE RECORDING ANNULAR VANE ASSEMBLY
Filed Aug. 26, 1959    3 Sheets-Sheet 2

INVENTOR
GEORGE WEHMANN

BY Roland A. Anderson

ATTORNEY

June 25, 1963　　　G. WEHMANN　　　3,094,869
REMOTE RECORDING ANNULAR VANE ASSEMBLY
Filed Aug. 26, 1959　　　　　3 Sheets-Sheet 3

INVENTOR
GEORGE WEHMANN
BY Roland A. Anderson
ATTORNEY

United States Patent Office  
3,094,869  
Patented June 25, 1963

3,094,869
REMOTE RECORDING ANNULAR VANE ASSEMBLY

George Wehmann, Idaho Falls, Idaho, assignor to the United States of America as represented by the United States Atomic Energy Commission
Filed Aug. 26, 1959, Ser. No. 836,316
5 Claims. (Cl. 73—189)

The present invention relates to the field of meterology, and particularly to instruments used in obtaining meterological data. In further detail, an apparatus is described for indicating wind direction in a three-dimensional sense for use by meterologists in ascertaining such weather information as the vertical wind velocity.

It has been the practice in the past to indicate wind direction by employing a vane assembly responsive to the horizontal wind flow. The vane assembly aligns itself with the wind and acts as a pointing member to show the horizontal wind direction. In many cases the weather instrument must be located at a remote position where it is impractical to observe the position of the pointing member. In addition, it is necessary that an accurate indication of the position of the pointing member be available where this data is incorporated in mathematical formulas for computing other weather variables.

The prior art devices have utilized pulley arrangements for transmitting the position of the vane to a remote point but this approach did not have the rugged features required for present day weather instruments and, in addition, the devices were highly complex and critical in adjustment. Attempts to improve on the pulley approach resulted in the use of various ararngements including variable resistors. However, these arrangements were not suitably adapted for the continuous and severe use encountered by weather instruments.

With particular reference to the need for a weather instrument capable of indicating the three-dimensional wind direction, i.e., the direction of the wind with respect to the vertical and horizontal planes, the problem of vane movement in both of these planes was acute. The vane must be mounted at approximately its mid-point to achieve balance, necessitating the location of the control elements for transmitting the vane position, such as servomechanism assemblies, at the balance pivot point of the vane, enlarging the housing surface area forward of the fin of the vane. Vane instability and inaccuracy resulted from the increase in the housing surface in the immediate vicinity of the vane.

With the limitations and problems encountered with the prior art devices in mind, the present invention was evolved for the purpose of transmitting data from a remote point on the three-dimensional wind direction.

Accordingly, one of the objects of the present invention is to have a rugged and inexpensive device for obtaining the direction of the three-dimensional wind.

A further object is to provide a vane construction which eliminates the need for complex servomechanisms to transmit the position of the vane, whereby the wind obstructing surface forward of the vane fin is reduced and the vane has improved stability.

In another respect, the present invention has for its object the incorporation of potentiometers directly coupled to the moving parts of the weather instrument for indicating the direction of the three-dimensional wind.

Another object of the invention is the arrangement of a three-dimensional wind weather vane wherein the parts that require frequent replacement may be removed with a minimum of time and effort.

In a more detailed respect, it is the object of the present invention to incorporate potentiometers in a vane assembly for measuring the three-dimensional wind direction, and to provide protection for the potentiometers from high temperature, wind and moisture, while at the same time permitting convenient replacement of the potentiometers.

It is a further object of the invention to provide a three-dimensional wind vane assembly wherein the movement of the vane in the vertical plane may be limited to a predesigned sector by the particular construction of the vane hub.

A still further object of the invention is to provide a slip-ring assembly associated with the mast of the three-dimensional wind vane assembly which is readily accessible for cleaning or replacement of the contacts or brushes.

In general, the present invention includes a weather vane assembly for remotely indicating the three-dimensional wind direction. A main housing rotatably supports one end of a mast and the vane is carried by a hub at its balance point on the other end of the mast for movement with the mast. The vane hub also provides for pivotal movement of the vane in a plane of the mast and houses a potentiometer which is coupled to the vane to rotate as the vane pivots.

The invention will be best understood by a description in connection with the drawings, wherein.

Figure 1:
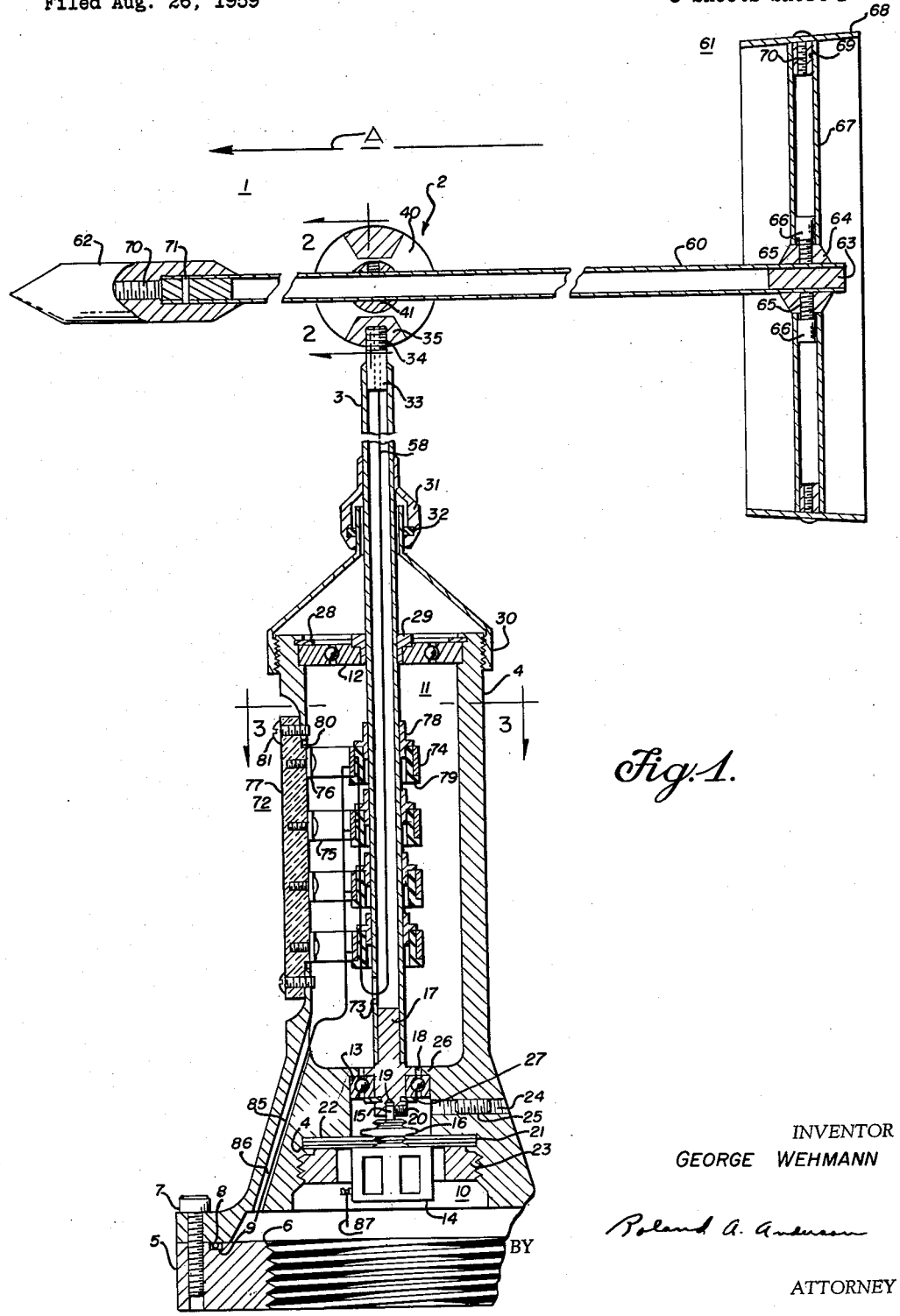
FIGURE 1 shows the over-all arrangement of the vane assembly in an elevated, cross-sectional view.

Referring to FIGURE 1, the three-dimensional wind vane assembly has for its principal components a vane 1, a vertical pivot assembly 2, mast 3, main housing 4, and flange 5. The flange 5 is of tubular shape and has an internal thread 6 which may be used to mount the flange to a supporting pipe (not shown) disposed in an elevated position. The main housing 4 is secured to the flange 5 by machine screws 7. Four of these machine screws may be circumferentially spaced around the flange 5 to firmly hold the main housing 4. A rubber O ring 8 is disposed in a circular groove 9 in the upper face of the flange 5. When the main housing 4 is secured to the flange 5, the O ring 8 seals the lower end of the main housing 4 from moisture entering through the juncture of the main housing 4 and flange 5.

The main housing 4 is open at the end adjacent the flange 5 and has a lower cavity 10 extending through to an upper cavity 11. The mast 3 extends into the main housing 4 at its upper end and further into the upper cavity 11. The mast 3 is rotatably supported in the main housing 4 by an upper bearing 12 and lower bearing 13 adjacent the lower cavity 10. The potentiometer 14 has a control shaft 15 and a mounting nut 16. The lower end of the mast 3 has a lower end fitting 17 extending into the end of the mast. The end fitting 17 has shoulders 18 preventing further movement of the lower end fitting 17 into the mast 3, while at the same time resting on the inner race of lower bearing 13. A central aperture 19 in the lower end fitting 17 receives the control shaft 15 of potentiometer 14, and a set screw 20 in the end fitting 17 holds the shaft 15 to the lower end fitting 17. Opening 24, opposite the set screw 20 in the main housing 4, provides access to the set screw 20. The opening 24 is closed by a set screw 25 to prevent the entrance of moisture and other material into lower cavity 10. The lower cavity 10 is internally threaded adjacent the potentiometer 14. A number of washers 21 are held to the potentiometer 14 by mounting nut 16. The washers 21 are clamped against a lip 22 of the main housing 4 by an externally threaded locking nut 23 engaged in the threaded portion of the main housing 4. With this arrangement, the potentiometer shaft 15 turns with the mast 3 and may be easily decoupled from the mast 3. Then, the potentiometer 14 may be conveniently withdrawn from the lower cavity 10 of the main housing 4 by removing the locking nut 23.

As mentioned earlier, the mast 3 is rotatably supported in the main housing 4 by an upper bearing 12 and lower bearing 13. The lower bearing 13 is held against a shoulder 26 of the main housing 4 by a retaining ring 27 placed in a groove in the lower end fitting 17. The upper bearing 12 rests in a recessed portion of the main housing 4 and is held in place by a retaining ring 28. At its upper support the mast 3 has a bushing 29 placed between it and the inner race of the upper bearing 12. The bushing 29 tightly joins the inner race of the upper bearing 12 to the mast 3 such that the mast 3 moves freely with respect to the main housing 4.

The upper end of the main housing 4 is externally threaded to receive a housing cap 30. The contour of the cap 30 narrows toward the mast 3 and extends in a parallel relation with the length of the mast 3 at its upper end. A mast seal 31 closes the housing cap 30 with the mast 3 and a felt ring 32 held within mast seal 31 keeps dust from within the main housing 4.

At the top of the mast 3 an upper end fitting 33 is tightly held within the mast and has a threaded portion 34 extending beyond the mast 3.

Figure 2:
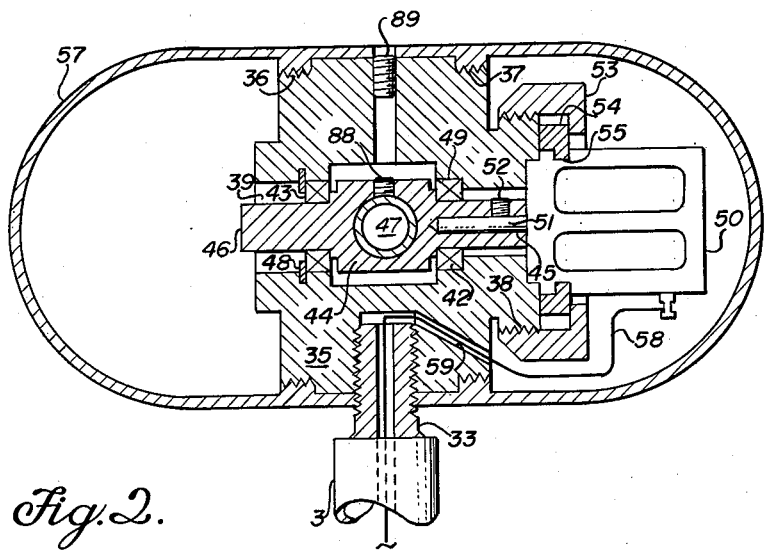
FIGURE 2 is a cross-sectional view of the vertical pivot assembly showing the arrangement for pivoting the vane and coupling the potentiometer, the plane of the section being indicated by the line 2—2 of FIGURE 1.

The movement of the vane 1 in the vertical plane is controlled by the vertical pivot assembly 2. The hub 35 of the vertical pivot assembly 2 is supported by the mast 3 with the threaded extension 34 of the end fitting 33 secured to the under side of the hub 35. With particular reference to FIGURE 2, the hub 35 is of circular cross-section having externally threaded end shoulders 36 and 37. Shoulder 38 of reduced diameter from shoulders 36 and 37 is also externally threaded and located at one end of hub 35. An axial passage 39 extends from end to end through the hub 35. As can be best seen in FIGURE 1, two sides of the hub 35 are open to define sectors 40 of equal angular spread on either side of the hub 35. The pivot shaft 41 is disposed within the axial passage 39 and rotatably supported by bearings 42 and 43. The pivot shaft 41 has a central body 44 with two arms 45 and 46 supported in the bearings 42 and 43, respectively. The central body 44 has a hole 47 passing completely through it, such that the bisecting line for sectors 40 extends through the center of the hole 47. According to this arrangement, a shaft secured in the hole 47 of pivot shaft 41 will be free to move within the limits of the walls of the hub 35 defining sectors 40. The angular spread of the sectors 40 may be 45° on either side of their bisector to permit movement of a shaft held by the pivot shaft 41 within this range.

The bearing 43 in the vertical pivot assembly 2 is retained in place against the central body 44 of the pivot shaft 41 by a retaining ring 48, and the other bearing 42 is pressed against a recessed portion 49 of the hub 35 by the central body 44 of the pivot shaft 41.

The position of the pivot shaft 41 is transmitted to a remote point by means of a potentiometer 50. The particular position of the pivot shaft 41 is represented by an electrical circuit variable controlled by the potentiometer 50. The control shaft 51 of the potentiometer 50 is held in an aperture of the pivot shaft arm 45 and turns with the pivot shaft 41. A set screw 52 secures the control shaft 51 to the pivot shaft arm 45. Access to the set screw 52 is provided by an opening in the hub 35 (not shown). The potentiometer 50 is mounted at the end of the hub 35 by clamping nut 53 screwed on the threaded shoulder 38. A split ring 54 comprising two semi-circular ring portions has a flange 55 extending into groove 56 of the potentiometer 50. As clamping nut 53 presses the split ring 54 against the hub 35, the potentiometer 50 is held and positioned with respect to the pivot shaft 41.

It can be seen that the potentiometer 50 is conveniently placed at the end of the hub 35 and may be withdrawn by simply removing the clamping nut 53 after the set screw 52 is loosened.

The internal parts of the vertical pivot assembly 2 are protected by dome-shaped covers 57 secured to the end shoulders 36 and 37. Access to the potentiometer and other working parts of the vertical pivot assembly 2 may be obtained by removing the covers 57. Lead wires 58 from potentiometer 50, referring to FIGURES 1 and 2, pass through a passage 59 in the hub 35, through the central passage of upper end fitting 33 and down the center of the mast 3.

The shaft 60 forms the central portion of the vane 1 by supporting the fin assembly 61 and the balance weight 62 at the hub of the vane 1. The shaft 60 is of tubular construction. The approximate balance point of the shaft 60 is held in the hole 47 of pivot shaft 41, while the shaft 60 passes through the sectors 40. In this manner, the shaft 60 is free to pivot in a vertical plane within the limits of sectors 40. Access to the set screw 88, securing shaft 60 to pivot shaft 41, is accomplished by the removal of set screw 89. A plug insert 63 at the tail of the shaft 60 provides a firm base for securing the fin assembly 61.

The fin assembly 61 comprises a shroud ring hub 64 fastened to the tail of the shaft 60 by set screws 65 and having three projecting arms 66 displaced 120° from each other. A strut 67 is fitted over each projecting arm 66 and rests against the shroud ring hub 64. The shroud ring 68 is coaxially positioned with respect to shaft 60 by struts 67. The end fitting 69 at the upper end of each strut 67 receives the machine screw 70 for securing the shroud ring 68 to the strut 67. The surface of the shroud ring 68 is inclined towards the hub of the shaft 60 at an angle of approximately 4° to the shaft. The effect is to give the shroud ring 68 a slight cone shape whereby the force of the wind acts on the inclined surface to channelize the wind and improve the stability of the vane 1.

The head end of the shaft 60 is provided with a balance weight 62 to counter the load of the fin assembly 61, and an insert 70 at the head end of the shaft 60 is held in place by a pin 71. A threaded portion of the insert 70 extends from the shaft 60 and the balance weight 62 is adjustably screwed on the shaft 60. By adjusting the position of the balance weight 62, a precise balance of the shaft 60 may be obtained such that the shaft 60 normally rests in a horizontal plane when there is no vertical wind velocity component.

The electrical connections to potentiometer 50 are transferred to the rotating mast 3 by a slip-ring assembly 72. The leads 58 from the potentiometer 50 pass through an opening 73 near the lower end of the mast 3 and are secured separately to individual slip rings 74. Electrical connection to the slip ring 74 is provided through brushes 75 attached to contact arms 76, referring to FIGURE 3, and a mounting plate 77 of electrical insulating material carries all the contact arm and brush arrangements. In further detail, slip-ring supports 78 are carried by the mast 3. A sleeve 79 of electrical insulating material surrounds the slip-ring support 78 and is tightly held thereto. The slip ring 74 is supported on a shoulder of the sleeve 79. The other slip-ring supports 78 are stacked with their adjacent ends interleaved. The mounting plate 77 is positioned in an opening 80 of the main housing 3 adjacent the slip rings 74. The plate is secured to the main housing 3 by machine screws 81.

Figure 3:
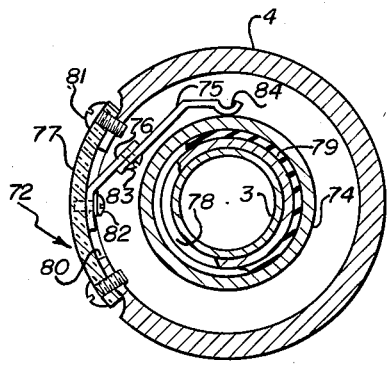
FIGURE 3 illustrates the contact, brush, and slip-ring arrangement utilized in the present three-dimensional wind vane assembly and is a partial cross section of the structure shown in FIGURE 1, the plane of the section being indicated by the line 3—3 of FIGURE 1.

With particular reference to FIGURE 3, the contact arm 76 is held to the mounting plate 77 by screw 82. The contact arm 76 is inclined at one end towards the slip ring 74 at an angle of approximately 45° from the main portion of the contact arm 76. The brush 75 is secured to the inclined portion of contact arm 76 by means of machine screw 83 and the extending portion of the brush 75 is inclined towards the ring 74, at approximately a 45° angle from the secured portion. In effect, the contact portion 84 of the brush 75 is substantially at right angles to the mounting plate 77 and is held tightly against the slip ring 74. This arrangement requires only a small area for the brush 75 and its mounting accessories, and the brush 75 may be conveniently withdrawn and replaced by simply removing the mounting plate 77. Each slip ring 74 has a contact arm 76 and brush 75 similarly arranged to provide electrical connection with its respective lead from the potentiometer 50. The leads 85 from the connections at mounting plate 77 are brought down passage 86 in the main housing 3 and out through the connecting flange 5 and associated support (not shown) to the associated electrical apparatus located at a remote point. The leads 87 from potentiometer 14 may similarly pass to its associate electrical apparatus.

Operation of the three-dimensional wind vane assembly may be generally described by reference to a particular wind direction indicated by arrow A. The vane 1 aligns itself with the wind direction as its fin assembly 61 captures a portion of the wind and forces the shaft 60 to move both in the horizontal and vertical planes. The shaft 60 is free to pivot within the hub 35 to the limits of the sectors 40 defined by the hub 35. The potentiometer 50 follows the movement of the shaft 60 in the vertical plane and the control shaft 15 of potentiometer 14 moves with the mast 3. With this arrangement, the vertical and horizontal position of the shaft 60 is continuously sensed by the potentiometers 50 and 14, and these potentiometers may be used in an appropriate electrical system to continuously monitor and record the three-dimensional wind direction.

An example of one application of the three-dimensional wind vane assembly, according to the present invention, may consist of its use in a system for continuously recording the vertical wind velocity. The atomic era has indicated that the present methods for determining vertical wind velocities are no longer suitable. The earliest vane assemblies were fragile and not suited for extended field use. In addition to being fragile, a long series of laborious computations were required before the magnitude of the vertical wind speed could be obtained. Thus, it is desirable to provide a three-dimensional wind vane assembly for use in a system capable of continuously recording values of the instantaneous vertical wind velocities.

Figure 4:
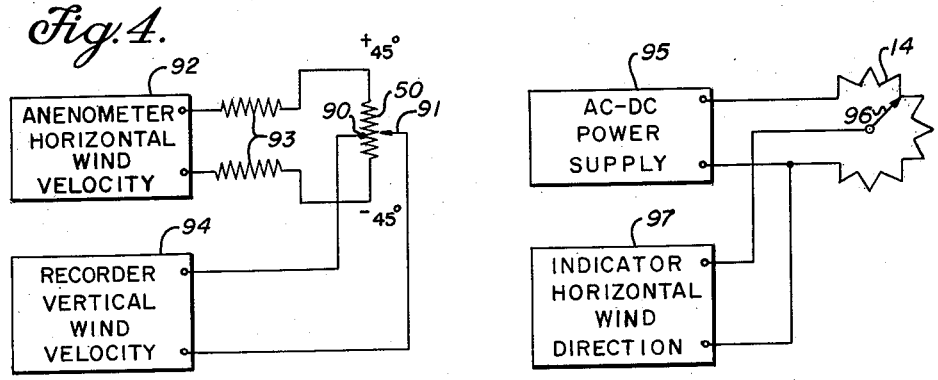
FIGURE 4 shows one application of the three-dimensional wind vane according to the present invention, whereby the vertical wind velocity and horizontal direction of the wind may be determined.

FIGURE 4 illustrates a vertical wind system using the vane assembly of the present invention. The principle on which this system operates may be illustrated by referring to Equation 1.

$$V_w = V_h \tan \theta \quad (1)$$

where $V_w$ is the vertical wind component of the three-dimensional wind, $V_h$ is the horizontal component of the three-dimensional wind and $\theta$ is the vertical inclination of the three-dimensional wind in degrees. From Equation 1 it can be seen that there are two variables which must be measured to determine the vertical component $V_w$. First, the horizontal wind speed must be measured. The second variable is the angle of inclination $\theta$ of the three-dimensional wind in the vertical plane. In addition, a recorder should be utilized to present a continuous record of the vertical wind velocity in a form suitable for use in meterological computations.

The system of FIGURE 4 incorporates the elements necessary for providing the continuous record of vertical wind velocity in a form capable of distinguishing between the vertical velocities in the upward direction, generally referred to as up-drafts, and vertical velocities in the downward direction, generally referred to as down-drafts. Referring again to FIGURE 1, the potentiometer 50 may be of special design, in particular it may be wound to represent the tangent function along its resistance element. The center-tap terminal 90 of the potentiometer 50 is located at the 0° point. Movement of the contact arm 91 through an angle of 45° on either side of the center-tap terminal 90 presents a resistance value between the center-tap terminal 90 and the control arm 91 which is proportional to the tangent of the angle of rotation of the control arm 91. Since it is difficult to design a potentiometer representing a tangent function of an angle greater than 45°, it is desirable to limit the movement of the control arm 91 to 45° either side of its mid-point position.

Figure 5:
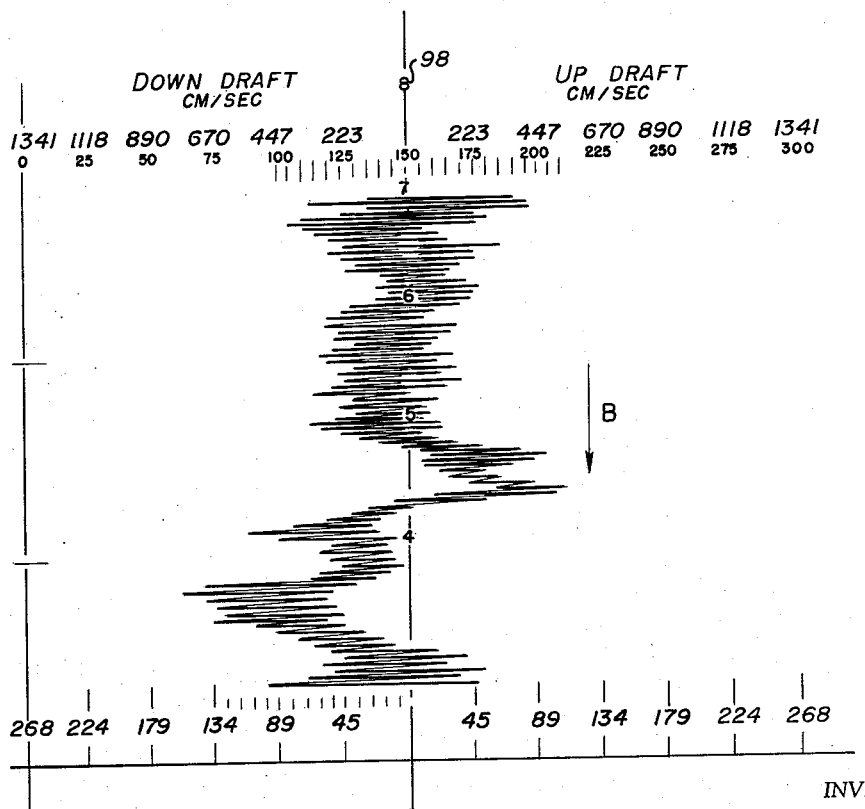
FIGURE 5 shows a presentation of the vertical wind velocity data using a chart recorder with the system shown in FIGURE 4.

The anemometer 92 produces a signal proportional to the horizontal wind velocity and its signal is coupled across the full resistance element of the potentiometer 50 through isolating resistors 93. The signal developed between the center-tap terminal 90 and contact arm 91 is proportional to the multiplication of the horizontal wind velocity and the tangent of the angle of inclination of the vane assembly. This product is directly proportional to the vertical wind velocity, as shown by Equation 1. By arranging the shaft 51 of potentiometer 50 such that the contact arm 91 is positioned at the center-tap terminal 90 when the shaft 60 is in the horizontal plane, the output of the multiplying circuit will have opposite polarities for up-draft and down-draft vertical wind directions. To take advantage of this relationship a chart recorder 94 may be used to present a continuous record of the vertical wind velocity in a form distinguishing between the up-draft and down-draft winds. FIGURE 5 is illustrative of such a presentation. The chart moves in the direction of arrow B. The center line 98 represents the position of the recorder pen for zero output from the multiplying circuit, i.e., when there is no vertical wind velocity. Deflection of the recorder pen to the right is representative of the vertical wind velocity in the upward direction, while deflection of the recorder pen to the left indicates the magnitude of the vertical wind velocity in the downward direction. With this presentation arrangement the meterologist can quickly ascertain both the magnitude and direction of the vertical wind velocity.

FIGURE 4 also shows the portion of the system arranged to indicate the horizontal wind direction. A source of constant voltage 95 is applied across the potentiometer 14, referring to FIGURE 1, and contact arm 96 rotates to alter the voltage applied to an indicator 97. The position of mast 3 determines the setting of contact arm 96 and thus the horizontal wind direction may be read directly from the indicator 97.

The three-dimensional wind vane assembly, according to the present invention, is particularly suited to the use in a system according to the arrangement shown in FIGURE 4. The multiplying potentiometer 50 is directly coupled to the shaft 60 of the vane assembly for rotational movement therewith. The alignment of the contact arm 91 relative to the horizontal position of the shaft 60 is facilitated by the convenient access and adjustment of the control arm 51 in the pivot shaft 41. The hub 35 is constructed to limit the pivotal movement of the shaft 60 in the vertical plane to the range of the specially wound tangential function potentiometer required by the system. And in the case where the three-dimensional wind vane assembly is incorporated in a system for continuously monitoring the vertical wind velocity, the need of frequent replacement of the potentiometers and slip-ring assembly components dictates the use of an arrangement according to the present invention where these parts may be quickly and conveniently replaced.

I claim:

1. A weather vane assembly for remotely indicating the three-dimensional wind direction, comprising a main housing having a central passage, a mast having an end rotatably supported in said central passage, a vane, means supporting said vane at its balance point on the other end of the mast for movement with the mast and providing for pivotal movement of the vane in a plane including the vane and the mast, a potentiometer, the shaft of the potentiometer being coupled to the vane to rotate as the vane pivots, said main housing having an opening at one side entering into said central passage adjacent the mast, a block of electrical insulation material, means removably securing said block over said opening, a conductive ring, means supporting said ring around the mast in a plane perpendicular to the axis of the mast, a contact arm and brush strip, means securing one end of said contact arm and brush strip against the inside face of said block opposite said ring and extending in a plane of said ring, said contact arm and brush strip having two successive 45 degree angle bends in the direction of said ring spaced along the strip to position the unsecured end of the strip in resilient contact with the ring at a point 90 degrees removed from the point on the ring opposite the fixed end of the contact arm and brush, means electrically connecting the ring to a terminal of the potentiometer whereby the potentiometer may be connected to a remote point with any mast rotation pattern.

2. A weather vane assembly for indicating the vertical wind direction comprising a vane shaft, a fin assembly on said shaft, a cylindrical hub having a central passage along its axis and having aligned openings on opposite sides entering into the central passage, a pivot shaft rotatably supported along the axis of said central passage and having an aperture opposite said openings, said vane shaft passing through each of said openings and aperture and being secured to said pivot shaft for movement with said pivot shaft, a first potentiometer wound to represent the tangent function from —45 to 45 degrees, the control shaft of said first potentiometer being coupled to an end of said pivot shaft for rotational movement with said pivot shaft, said openings limiting the movement of the vane shaft to 45 degrees on either side of a median plane passing through said openings and including said pivot shaft, an externally threaded shoulder at one end of said hub having a smaller radius than the hub, a circumferential groove in said first potentiometer, a ring disposed in said groove and extending outward therefrom, a nut threaded on said shoulder clamping said ring and potentiometer to the hub, a protective cover removably secured at each end of said hub, a main housing having a central passage, a mast having an end rotatably supported in said main housing central passage and the other end attached to said hub, a second potentiometer having a control shaft, means coupling the control shaft of said second potentiometer to said mast at the end opposite the hub for rotational movement with said mast, a washer, said washer being secured to the second potentiometer by said potentiometer mounting nut, means removably locking said washer to the main housing, an opening at one side of said main housing entering into the central passage of said main housing adjacent the mast, a block of electrical insulating material, means removably securing said block over said opening, a conductive ring, means supporting said ring around the mast in a plane perpendicular to the axis of the mast, a contact arm and brush strip, means securing one end of said contact arm and brush strip against the inside face of said block opposite said ring and extending in a plane of said ring, said contact arm and brush strip having two successive 45 degree angle bends in the direction of said ring spaced along the strip to position the unsecured end of the strip in resilient contact with the ring at a point 90 degrees removed from the point on the ring opposite the fixed end of the contact arm and brush, and means electrically connecting the ring to a terminal of said first potentiometer.

3. Apparatus for measuring vertical wind velocity comprising anemometer means for providing a first direct current electrical signal varying in electrical value in proportion to the horizontal wind velocity, a potentiometer having a center tap electrical connection between its opposite ends, said potentiometer having impedance values which vary as a trigonometric tangent function from the center tap representing 0° to one end representing +45° and to the other end representing —45°, means for connecting said first electrical signal across the ends of said potentiometer, and adjustable tap connection on said potentiometer, means for measuring the vertical inclination of wind direction from the horizontal, means for varying the physical position of said adjustable tap from the center tap in direct proportion to the angle of said vertical inclination, and output means connected between said adjustable tap and said center tap whereby the output signal value indicates the amount and its polarity indicates the upward or downward direction of the vertical component of air velocity.

4. A weather vane assembly for remotely indicating vertical wind velocity, comprising a main housing, a mast having an end rotatably supported in said main housing, a vane, means supporting said vane at its balance point on the other end of the mast for movement with the mast and for providing pivotal movement of the vane in a plane including the vane and the mast, said last named means including means limiting the pivotal movement of the vane to an angle of 45 degrees either side of a plane perpendicular to the mast, a potentiometer having impedance values representing the tangent function from —45 to +45 degrees to provide a first electrical output, means for coupling the vane to the potentiometer for rotational movement of the potentiometer shaft as the vane pivots, means for measuring horizontal wind velocity in a direction coincident with the plane including the mast and vane, said last named means providing a second electrical output proportional to said velocity, and means for multiplying said first and second electrical outputs whereby a product is obtained which represents vertical wind velocity.

5. In a weather vane assembly for indicating horizontal and vertical wind direction having a vane shaft and a fin assembly on said shaft, the improvement comprising a substantially cylindrical hub having its longitudinal axis between its ends aligned in a substantially horizontal plane and having two openings on its circumference displaced substantially 180 degrees from each other with respect to the axis of the cylinder, pivot shaft means within said cylinder having an opening aligned with said two openings, means for mounting said pivot shaft means within said cylinder for rotation of the pivot with respect to said cylinder only in a vertical plane, means for adjustably mounting said vane within said pivot opening for passage through both said two openings, means for limiting the maximum movement of said pivot and vane plus or minus to an angle of 45 degrees from their normal horizontal rest position, means for rotatably supporting said hub in an elevated position, potentiometer means having non-linear resistance values which vary along the length of the potentiometer in direct relationship to the tangent of an angle from zero to forty-five degrees, means mechanically coupling the potentiometer shaft to said pivot means for rotation therewith, cover means adjustably mounted on the outer circumference of the cylinder for enclosing said potentiometer, a housing, means for rotatably supporting said hub in said housing, a second potentiometer shaft coupled for rotation with said hub within said housing, a slip ring and brush assembly within said housing for transferring the electrical outputs from said potentiometers, and a removable dielectric cover plate associated with the housing for mounting the brushes and for permitting inspection thereof.

References Cited in the file of this patent

UNITED STATES PATENTS

| | | |
|---|---|---|
| 2,266,172 | Davis | Dec. 16, 1941 |
| 2,619,527 | Gray | Nov. 25, 1952 |
| 2,742,783 | Jasse | Apr. 24, 1956 |
| 3,055,215 | Ivie | Sept. 25, 1962 |

FOREIGN PATENTS

| | | |
|---|---|---|
| 367,053 | Germany | Jan. 16, 1923 |